United States Patent [19]
Levy et al.

[11] Patent Number: 5,995,961
[45] Date of Patent: *Nov. 30, 1999

[54] INFORMATION MANIFOLD FOR QUERY PROCESSING

[75] Inventors: Alon Y. Levy, Berkeley Heights; Joann J. Ordille, Maplewood, both of N.J.; Anand Rajaraman, Stamford, Calif.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/745,071

[22] Filed: Nov. 7, 1996

Related U.S. Application Data

[60] Provisional application No. 60/006,284, Nov. 7, 1995, abandoned.

[51] Int. Cl.⁶ .................................................. G06F 17/30
[52] U.S. Cl. ........................................ 707/4; 707/3; 707/2
[58] Field of Search ................................. 707/1, 2, 5, 10, 707/63, 3, 4

[56] References Cited

U.S. PATENT DOCUMENTS

| | | | |
|---|---|---|---|
| 5,276,870 | 1/1994 | Shan et al. | 707/5 |
| 5,325,465 | 6/1994 | Hung et al. | 395/63 |
| 5,367,675 | 11/1994 | Cheng et al. | 707/2 |
| 5,495,605 | 2/1996 | Cadot | 707/2 |
| 5,546,576 | 8/1996 | Cochrane et al. | 707/2 |
| 5,548,755 | 8/1996 | Leung et al. | 707/2 |
| 5,574,900 | 11/1996 | Huang et al. | 707/1 |
| 5,596,744 | 1/1997 | Dao et al. | 707/10 |
| 5,600,831 | 2/1997 | Levy et al. | 707/2 |
| 5,655,116 | 8/1997 | Kirk et al. | 707/1 |

OTHER PUBLICATIONS

Levy et al, Queries Independent of Updates, Proceedings of the 19 th VLDB Conference Dublin, Ireland, 1993.

Hong et al, Optimization of Parallel Query Execution Plan in XPRS, IEEE, pp. 218–225, Dec. 1991.

C. Mic. Bowman et al., "Scalable Internet Resource Discovery: Research Problems and Approaches," Communications of ACM, 37(8):98–107 (1994).

Surajit Chaudhuri et al., "Optimizing Queries With Materialized Views," in Proceedings of International Conference on Data Engineering (1995).

Sudarsha Chawathe, et al., The TSIMMIS Project: Integration of Heterogenous Information Sources: in Proceedings of IPSJ (1994).

Oren Etzione and Daniel Weld, "A Softbot–Based Interface to the Internet," Communications of ACM, 37(7):72–76 (1994).

Douglas Fang, et al., "The Identification and Resolution of Semantic Heterogeneity In Multidatabase Systems," in Multidatabase Systems: An Advanced Solution for Global Information Sharing, pp. 52–59 (1991).

Luis Gravano, et al., "The Effectiveness of Gloss for the Text Database Discovery Problem," in proceedings of SIG-MOD–94, pp. 126–137 (1994).

(List continued on next page.)

*Primary Examiner*—Thomas G. Black
*Assistant Examiner*—Frantz Coby

[57] ABSTRACT

A system and method for accepting and responding to queries based on information stored on multiple heterogenous information sources. A uniform query interface to large collections of structured information sources is provided to a user to pose queries using a uniform schema of the available information. A query plan for answering the query is formulated from descriptions of the contents and capabilities of the available information sources. Based on these descriptions logical solutions which are subsets of the complete solution to the query are derived. An order for executing these solutions is determined based on the input requirements and other capabilities of the relevant information sources.

18 Claims, 4 Drawing Sheets

OTHER PUBLICATIONS

Michael R. Gray and David S. Johnson, "Computers and Intractability" A Guide to the Theory of NP–Completeness, (W.H. Freeman & Co. 1979).

Craig A. Knoblock, "Planning Executing, Sensing and Replanning for Information Gathering," in Proceedings of the 14th International Joint Conference on Artificial Intelligence (1995).

David Konopnicki and Oded Shmueli, "W3QS: A Query System for the WWW," in Proceedings of the 21st VLDB Conference (1995).

Alon Y. Levy, et al., "Answering Queries Using Views," in Proceedings of the 14th ACM SIGACT–SIGMOD–SIGART Symposium on Principles of Database Systems (1995).

Alon Y. Levy and Joann J. Ordille, " An Experiment in Integrating Internet Information Sources," in Working Notes of the AAAI Fall Symposium on AI Applications in Knowledge Navigation (1994).

Alon Y. Levy, et al., "Answering Queries Using Limited External Processors," Proceedings of ACM SIGACT–SIGMOD–SIGART Symposium on Principles of Database Systems (1996).

Alon Y. Levy and Marie–Christine Rousset, "CARIN: A Representation Language Integrating Rules and Description Logics," in Proceedings of the International Workshop on Description Logics (1995).

Alon Y. Levy and Yehoshua Sagiv, "Queries Independent of Updates," in Proceedings of the 19th VLDB Conference,pp. 171–181 (1993).

Alon Y. Levy, et al., "Data Model and Query Evaluation in Global Information Systems," Journal of Intelligent Information Systems, Special Issue on Networked Information Discovery and retrieval, (1995).

R. Hedberg et. al., "The CCSO Nameserver (Ph) Architecture," URL: ftp ://ftp.internic.net/internet–drafts/draft–ietf–ids–ph–0.2.txt (Internet Draft Dec. 1995).

K.A. Morris, "An algorithm for ordering subgoals in NAIL!," in Proceedings of the 11th ACM SIGACT–SIGMOD–SIGART Symposium on Principles of Database Systems pp. 82–88 (1988).

Joann J. Ordille, "Descriptive Name Services for Large Internets," Ph.D. Thesis University of Wisconsin (1993).

Joann J. Ordille and Barton P. Miller, "Distributed Active Catalogs and Meta–Data Caching Descriptive Name Services," in Proceedings of the 13th international IEEE Conference on Distributed Computing Systems, pp. 120–129 (1993).

Yannis Papakonstantinou, et al., "A Query Translation Scheme for Rapid Implementation of Wrappers," in Proceedings of the Conference on Deductive and Object Oriented Databases, (1995).

Xiaolei Qian, "Query Folding," in Proceedings of the 12th International Conference on Data Engineering pp. 48–55 (1996).

Anand Rajaraman, et al., "Answering Queries Using Templates With Binding Patterns," in Proceedings of the 14th ACM SIGACT–SIGMOD–SIGART Symposium on Principles of Database Systems (1995).

Anand Rajaraman and Jeffrey D. Ullman, "International Information By Quterjoins and Full Disjunctions", In Proceedings of the 14th ACM SIGACT–SIGMOD–SIGART Symposium on Principles of Database Systems (1995).

V. S. Subrahmanian, et al., "HERMES: A Heterogenous Reasoning and Mediator System," Technical report (1995).

S. Dorner and P. Pomes, "The CCSO Nameserver—A Description," Computer and Communications Services Office (V.11. Aug. 1992).

Gio Wiederhold, "Mediators In The Architecture of Future Information Systems," IEEE Computer, pp. 38–49 (1992).

Darrel Woelk, et al., "Task Scheduling Using Intertask Dependencies In Carnot," in Proceedings of the 1993 ACM SIGMOD International Conference on Management of Data, pp. 491–494 (1993).

H. Z. Yang and P. A. Larson, "Query Transformation For PSJ–Queries," in Proceedings of the 13th International VLDB Conference, pp. 245–254 (1987).

Serge Abiteboul, et al., "Querying and Updating The File," in Proceedings of the 19th VLDB Conference (1993).

Rafi Ahmed, et al., "The Pegasus Heterogenous Multidatabase System," IEEE Computer, pp. 19–26 (1991).

Yigal Arens, et al., "Retrieving and Integrating Data From Multiple Information Sources," International Journal on Intelligent and Cooperative Information Systems (1994).

Alex Borgida, et al., "CLASSIC: A Structural Data Model for Objects," in Proceedings of the 1989 ACM SIGMOD International Conference on Management of Data, pp. 58–67 (1989).

SOURCE 1:
USED CARS FOR SALE AFTER 1985.
CONTENTS:
$v_1(X)$: -carForSale(X) & usedCar(X) &
    year(X) ≥1985.
CAPABILITIES:
EQUALITY INPUTS: {model(X), makeCountry(X)}
SELECTION INPUTS: {year(X), mileage(X)}
MINIMUM NUMBER OF INPUTS: 1
MAXIMUM NUMBER OF INPUTS: 4
OUTPUTS: {year(X), model(X), mileage(X),
    price(X), makeCountry(X),
    ownerContact(X)}

SOURCE 2:
EUROPEAN CARS FOR SALE.

$v_2(X)$: -carForSale(X) & EuropeanCar(X)

{year(X), makeCountry(X)}
{mileage(X)}
1
3
{year(X), model(X), mileage(X),
makeCountry(X), history(X), price(X),
ownerContact(X)}

SOURCE 3:
ALLSTATE INSURANCE AGENCY.
CONTENTS:
$v_3$(AGENT, YEAR, MODEL, MILEAGE, HIST,
    AGE, CITY, PREMIUM): -
    QUOTE (AGENT, YEAR, MODEL, MILEAGE, HIST,
        AGE, CITY, PREMIUM) &
    AGENT = ALLSTATE & CITY = NYC
CAPABILITIES:
EQUALITY
INPUTS: {YEAR, MODEL, MILEAGE, HIST, AGE, CITY}
MINIMUM NUMBER OF INPUTS: 6
MAXIMUM NUMBER OF INPUTS: 6
OUTPUTS: {PREMIUM}

SOURCE 4:
AAA INSURANCE AGENCY.

$v_4$(AGENT, YEAR, MODEL, MILEAGE, AGE,
    CITY, PREMIUM): -
    QUOTE (AGENT, YEAR, MODEL, MILEAGE, HIST,
        AGE, CITY, PREMIUM) &
    AGENT = AAA & CITY = NYC

{YEAR, MODEL, MILEAGE, AGE, CITY}
5
5
{PREMIUM}

FIG. 4

```
PROCEDURE GENERATE-RELEVANT-SOURCES (I, Q)
/* I IS A SET OF INFORMATION SOURCES, AND Q IS A CONJUNCTIVE QUERY OF THE FORM */
Q: q(X̄) :- g₁(X̄₁) &...& gₘ(X̄ₘ) & Cq */

FOR EVERY NON-INTERPRETED SUBGOAL gⱼ(X̄ⱼ), 1≤i≤m DO:
    relevantSourcesViewsᵢ = 0
    FOR EVERY NON-INTERPRETED SUBGOAL u(Ȳ) IN THE BODY OF A VIEW v IN THE CONTENT DESCRIPTION OF I ∈ I DO:
        IF gⱼ = u OR gⱼ AND u ARE NON-DISJOINT CLASS DESCRIPTIONS THEN:
            LET Ψ BE THE MAPPING DEFINED ON THE VARIABLES OF v AS FOLLOWS:
                IF Y IS THE j'TH VARIABLE IN Ȳ AND IS IN THE HEAD OF v
                    THEN Ψ(Y) = Xⱼ, WHERE Xⱼ IS THE j'TH VARIABLE IN X̄ⱼ
                ELSE Ψ(Y) IS A NEW VARIABLE THAT DOES NOT APPEAR IN Q OR v
            LET C(Q) AND C(v) BE THE CONJUNCTION OF CONSTRAINT SUBGOALS IN Q AND Ψ(v), RESPECTIVELY
            IF C(Q) AND C(v) ARE NON-DISJOINT CONSTRAINTS THEN ADD (I, Ψ(v)) TO relevantSourceViewsᵢ
RETURN relevantSourceViews₁,...,relevantSourceViewsₘ
END GENERATE-RELEVANT-SOURCES
```

FIG. 5

```
PROCEDURE PROPAGATE-AVAILABLE-ARGUMENTS (Q, BINDINGS)
/* Q IS A CONJUNCTIVE QUERY AND BINDINGS ARE A SET OF ARGUMENTS IN Q */
/* r̄₁ AND r̄₂ DENOTE (PERHAPS EMPTY) ROLE-CHAINS */
UNTIL NO MORE ARGUMENTS ARE ADDED TO BINDINGS DO:
    IF r̄₁(X) ∈ BINDINGS AND X IS A FILLER ON THE CHAIN r̄₂(Y) IN Q, THEN ADD r̄₁r̄₂(Y) TO BINDINGS
    IF r̄₁r̄₂(Y) ∈ BINDINGS AND X IS A FILLER ON THE CHAIN r̄₂(Y) IN Q, THEN
        IF THE CONSTRAINT [Z=r̄₂(Y) & X=r̄₂(Y) & X≠Z₁ IS NOT SATISFIABLE, THEN ADD r̄₁(X) TO BINDINGS
RETURN BINDINGS
END PROPAGATE-AVAILABLE-ARGUMENTS
```

FIG. 6

```
PROCEDURE CREATE-EXECUTABLE-PLAN(Q')
/* Q' IS A LOGICAL SOLUTION WHOSE NON-INTERPRETED SUBGOALS ARE u_1,...,u_n */
/* WE ASSUME ALL BINDINGS IN Q' ARE GIVEN EXPLICITLY USING THE = RELATION AS A CONJUNCT */
QueryBindings = THE SET OF VARIABLES IN Q' BOUND BY VALUES IN THE QUERY
QuerySelections = THE SET OF VARIABLES IN Q' FOR WHICH THE QUERY CONTAINS A SELECTION
BindAvail_0 = PROPAGATE-AVAILABLE-ARGUMENTS(Q',QueryBindings)
FOR i = 1,...,n
    THE i'TH SUBGOAL IN THE ORDERING, v_i, IS ANY SUBGOAL u_j OF Q' THAT WAS NOT CHOSEN EARLIER AND
    AT LEAST u_{min}^j OF THE ARGUMENTS IN u_{in}^j ARE IN BindAvail_{i-1}
    IF THERE IS NO SUCH SUBGOAL, RETURN NON-EXECUTABLE, ELSE
        BindAvail_i = PROPAGATE-AVAILABLE-ARGUMENTS (Q',BindAvail_{i-1} ∪ u_{out}^j)
        v_{in}^i = A MINIMAL SET OF ARGUMENTS IN BindAvail_{i-1} THAT SATISFIED THE INPUT REQUIREMENT
        v_{out}^i = ALL THE ARGUMENTS IN u_{out}^j
END FOR
IF Q_{out} ⊄ BindAvail_n RETURN NON-EXECUTABLE
REMOVE ANY ELEMENT FROM v_{out}^i THAT IS NOT NEEDED FOR CONNECTIVITY OF VARIABLES IN THE QUERY
IF THERE ARE TWO OCCURENCES OF A VARIABLE x ∈ Q' THAT ARE NOT CONNECTED, RETURN NON-EXECUTABLE
FOR i = 1,...,n
    v_{sel}^i IS THE MAXIMAL NUMBER OF ARGUMENTS FROM QuerySelections ∪ BindAvail_{i-1} SUCH THAT THE
    CARDINALITY OF v_{in}^i ∪ v_{sel}^i DOES NOT EXCEED THE INPUT CAPACITY OF ITS SOURCE
RETURN (v_1, v_{in}^1, v_{out}^1, v_{sel}^1),..., (v_n, v_{in}^n, v_{out}^n, v_{sel}^n)
END CREATE-EXECUTABLE-PLAN
```

INFORMATION MANIFOLD FOR QUERY PROCESSING

CROSS REFERENCE TO PROVISIONAL APPLICATION

This application claims the benefit of U.S. Provisional Application Ser. No. 60/006,284, filed on Nov. 7, 1995 abandoned.

TECHNICAL FIELD

This invention relates generally to a method for querying information sources. In particular the invention relates to a user service for searching multiple information sources for information responsive to a user's query.

BACKGROUND OF THE INVENTION

The World Wide Web ("WWW") provides access to a multitude of information sources, of which a growing number are structured, and provides a query interface (e.g., HTML forms). Unlike unstructured sources that can only be viewed and browsed by the user, structured sources answer specific user queries. Even more sources behave as structured sources with an appropriate interface program, for example, those for parsing structured text files. Currently, the interaction with services that access rich collections of structured information sources, for example, French Teletel, France's public telephone system, is much like browsing. The user must consider the available sources, decide which sources to access, and then individually interact with them, using only the schema and query interface peculiar to that source.

Since there is no effective tool for combining information from multiple structured sources, it is very difficult to search relevant sources, defined as sources having information responsive in either in whole or in part to a query, even if a list of sources is available, and certainly when the user has to find the relevant sources on the WWW.

There are several challenges in providing a system to query multiple information sources. First, information sources are generally autonomous and therefore heterogeneous, i.e. using different data models, schema and representations for objects. A service for responding to a user's query from information found in multiple sources must account for these differences. Second, the service must account for the fact that many information sources have closely related data: many publication repositories, many market databases, and many name servers. The service must be capable of modeling the fine differences between the content of different sources to determine efficiently which sources contain information necessary to answer a given query. Third, information sources tend to contain incomplete information. For example, few publication repositories can claim to contain all publications of a certain class, and therefore multiple sources need to be queried for the same information. Finally, information sources differ not only in their content, but also in their capabilities. For example, one source may require that certain arguments be bound in queries, while another source may have the ability to perform limited forms of processing. For example, responding to a query may ideally require a selection on certain attributes, in order to minimize the amount of data transmitted over the network, and to optimize the data processing required to answer a user's query.

Several existing systems provide access to multiple information sources using the notion of a mediator, as described in G. Wiederhold, "Mediators in the Architecture of Future Information Systems," IEEE Computer, pp.38–49 (1992), hereby incorporated by reference as if fully set forth herein. However, in these systems mediators are built either for specific information sources or for specific query forms. They are not source and query independent. Examples of systems using the notion of a mediator include TSIMMIS, described in S. Chawathe, et al., "The TSIMMIS Project: Integration of Heterogenous Information Sources," Proceedings of IPSJ, Tokyo (October 1994)); HERMES described in V. S. Subrahmanian, et al, "HERMES: A Heterogeneous Reasoning and Mediator System," Technical Report, University of Maryland (1995); and Nomenclator described in Joann J. Ordille, "Descriptive Name Services for Large Internets," PhD thesis, University of Wisconsin, (1993) and Joann J. Ordille and Barton P. Miller, "Distributed Active Catalogs and Meta-Data Caching in Descriptive Name Services" Proceedings of the 13th International IEEE Conference on Distributed Computing Systems, pp. 120–9 (1993), all of which are hereby incorporated by reference as if fully set forth herein.

In the Nomenclator system, for example, multiple CCSO, X.500 and relational nameservers are incorporated. The CCSO nameserver is more fully described in R. Hedberg et al., "The CCSO Nameserver (Ph) Architecture," URL:ftp://ftp.internic.net/internet-drafts/draft-ietf-ids-ph-02.txt (Internet Draft 12/95) and S. Dorner and P. Pomes, "The CCSO Nameserver—A Description," Technical Report, Computer and Communications Services Office (U. Ill. 8/92), both of which are hereby incorporated by reference as if fully set forth herein. A description of X.500 can be found in CCITT, The Directory, Recommendations X.500, X.501, X.509, X.518–X.521 (1988), hereby incorporated by reference as if fully set forth herein. Source descriptions are given as equality selections on a single relation, and queries can only reference one relation.

The SIMS system, described in Yigal Arens, et al., "Retrieving and Integrating Data from Multiple Information Sources" Int'l Journal on Intelligent and Cooperative Information System (1994), describes information sources via class descriptions. SIMS, as well as the Internet Softbot, described in Oren Etzioni and Daniel Weld, "A Softbot-Based Interface to the Internet," Communication of ACM 37 (7):72–76 (1994), hereby incorporated by reference as if fully set forth herein, use artificial intelligence planning techniques for identifying the relevant information sources and creating a query plan. These approaches do not consider capability descriptions of the sources, and do not guarantee to find all and only the relevant sources.

In Alon Y. Levy, et al., "Data Model and Query Evaluation in Global Information Systems," Journal of Intelligent Information Systems, Special Issue on Networked Information Discovery and Retrieval (1995), hereby incorporated by reference as if fully set forth herein, a language was proposed for describing information sources. However, with the language and algorithms described, only a limited number of information sources could be incorporated in a response to a query.

Finally, there are several indexing systems for finding information on the World Wide Web such as Yahoo, Lycos, Harvest, described in C. Mic. Bowman, et al., "Scalable Internet Resource Discovery: Research Problems and Approaches," Communication of ACM, 37(8):98–107 (1994), and Gloss described in Luis Gravano, et al., "The Effectiveness of Gloss for the Text Database Discovery Problem," in Proceedings of SIGMOD-94 pp. 126–137 (1994), both of which are hereby incorporated by reference as if fully set forth herein. These systems are all based on keyword searches on contents or annotations of documents, and are only able to retrieve documents that match these keywords. They cannot answer semantically meaningful queries that require considering the contents of the sources.

One system for specifying high-level queries over unstructured information sources is W3QS, described in David Konopnicki and Oded Shmueli, "W3QS: A Query System for the WWW," Proceedings of the 21st VLDB Conference (1995), hereby incorporated by reference as if fully set forth herein. While this system enables a user to specify in the query, patterns of nodes on the web and properties of such nodes that can be checked using existing Unix utilities, and enables a lot of otherwise manual searches to be done by a search engine, it does not make use of the contents of structured sources, and it does not combine information from multiple sources.

U.S. patent application Ser. No. 08/203,082, now U.S. Pat. No. 5,655,116 allowed on Jul. 31, 1996 and U.S. patent application Ser. No. 08/347,016, now U.S. Pat. No. 5,600,831 allowed on Jul. 17, 1996, both of which are commonly assigned with the present application, relate to apparatus and method for retrieving information from multiple information sources using a world view of the avaliable information sources. The subject matter covered by these applications, however, do not exploit the capabilities of the information sources in solving queries.

SUMMARY OF THE INVENTION

Accordingly, the present invention provides a user with a uniform query interface to large collections of structured information sources that considers the details of interacting with each source, and exploits the capabilities of the available information sources. The user is presented with the schema of a world-view of all of the accessible information sources, in other words a set of classes and relations about the domain of the information sources. The world-view describes the contents of information sources and their capabilities such as their binding requirements and their local processing capabilities, necessary for interacting with many existing sources. The user formulates queries in terms of the world-view relations. Given a query, descriptions of the contents and capabilities of the available information sources are accessed to determine which information sources are relevant, in other words contain information that is responsive in whole or in part to the query, and whether the relevant information sources can be combined in a manner that satisfies the capabilities of the sources and exploits those capabilities as much as possible. Based on the descriptions, a plan for answering the query that satisfies and exploits the capabilities of the information sources is generated.

BRIEF DESCRIPTION OF THE DRAWINGS

FIG. 3 shows the content and capability descriptions of four information sources.

FIG. 4 is an illustrative algorithm written in pseudo code, for identifying source views to a subgoal of a query in accordance with the present invention.

FIG. 5 is an illustrative algorithm written in pseudo code, for computing executable solutions in accordance with the present invention.

FIG. 6 is an illustrative algorithm written in pseudo code, for generating an executable plan from executable solutions.

DETAILED DESCRIPTION OF THE INVENTION

Figure 1:
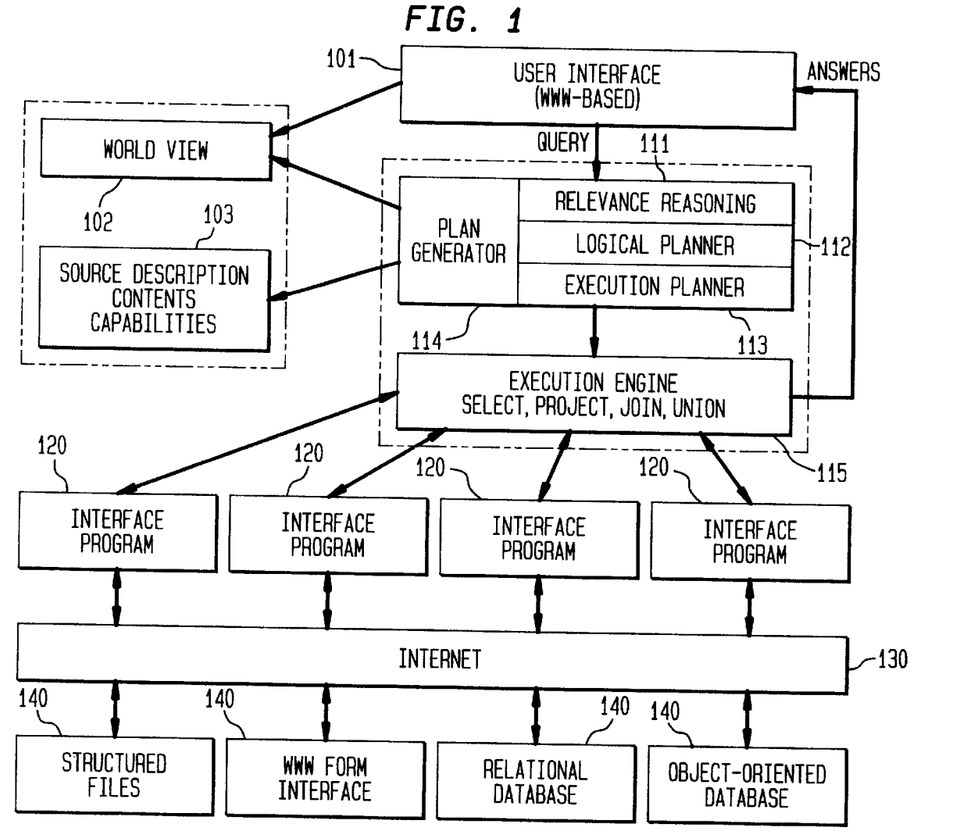
FIG. 1 illustrates the architecture of one embodiment of the present invention.

Referring to FIG. 1, the architecture of one embodiment of the present invention is shown. WWW user interface 101 presents a user with the schema of world-view 102 of all of the accessible information sources 140 located via Internet 130. Interface programs 120 consider the details of interacting with each source and translate between representations of objects in the information sources and their representation as complex host constants in the world-view as discussed further below. For example, the interface program may supply input to an HTML form interface and obtain the answer to a query, or, alternatively, obtain data from a structured text file using techniques as described in S. Abiteboul, et al., "Querying and Updating the File," Proceedings of the 19th VLDB Conference, Dublin (1993) and A. Rajaraman and J. D. Ullman, "Integrating Information by Outerjoins and Full Disjunctions," in Proceedings of the 14th ACM SIGACT-SIGMOD-SIGART Symposium on Principles of Database Systems (1995), both of which are hereby incorporated by reference as if fully set forth herein.

Using the world-view schema, the user formulates a query. Given a query, Plan Generator 114 accesses source descriptions 103 in which the contents and capabilities of the available information sources are available. Based on the descriptions, Plan Generator 114 determines which information sources are relevant for the given query, as shown in Relevance Reasoning block 111, and formulates a plan for answering the query that satisfies and exploits the capabilities of the information sources, as shown in blocks 112 and 113. The plan is then carried out by execution engine 115 which returns the query answer through user interface 101.

The uniform query interface to the multiple information sources has two advantages. First, the user need not consider all possible information sources, or even be aware of all existing information sources. Second, the user can explicitly ask for the information from one group of information sources to be combined with the information from another group of information sources.

Figure 2:
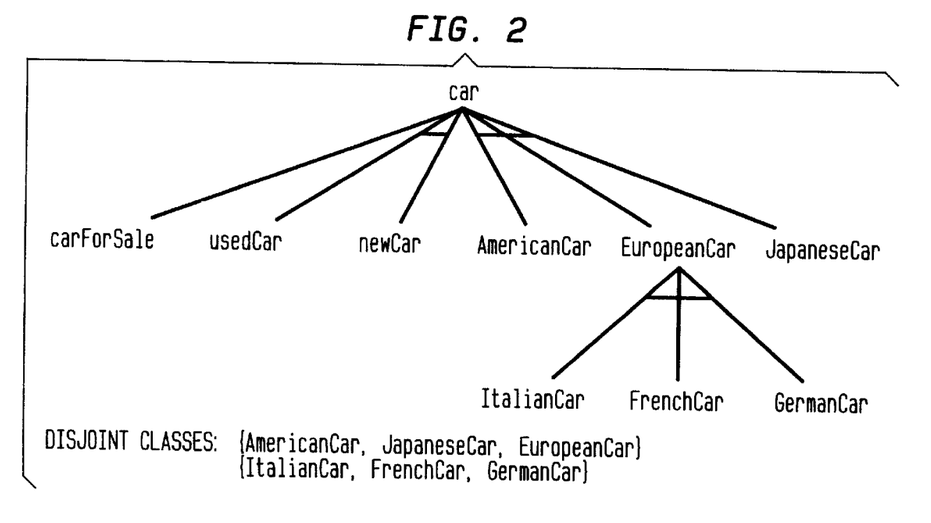
FIG. 2 is a graphical illustration of a class hierarchy of the subject "cars."

Referring to FIGS. 2 and 3 to illustrate, an information broker for purchasing cars provides access to several databases describing cars for sale and to several servers providing online quotes for insurance premiums. Ordinarily, a user looking for a car from these sources has to first access each of the car sources individually, and retrieve all the cars that may be relevant. The user must then enter the data into one or more of the insurance servers to get a premium quote. As this task is tedious, the user is likely to decide on a car and then search for insurance, notwithstanding that insurance premiums vary between models and other attributes of cars, and therefore a car that seemed like a good buy may seem less desirable after the insurance premium is considered, or vice versa.

In contrast, a prospective buyer using the present invention can be provided with a schema identifying various classes of cars with many attributes, including: mileage; year; price; model history; and makeCountry, and a relation quote, that for a given insurance agent, year, model, mileage and accident history of a car, and the age and city of a driver, provides the annual insurance premium.

The relation quote and the car classes are only virtual, i.e., they do not actually contain tuples of data or objects. The actual data is stored in information sources identified by descriptions specifying the contents and capabilities of the information source. For example, referring to FIG. 3, information sources 1 and 2 contain instances of used cars and some information about them. Source 1, as described by the definition of view $v_1$, contains only used cars manufactured in 1985 or later, while source 2 has only European cars. The capability description of the sources indicates which queries the source can answer. In other words, the capability descriptions indicates the inputs that must be supplied and the inputs that may be supplied to constrain the query to the source. Source 1 can be given either the model of the car or the country of its manufacturer as an input, and can also perform selections on the manufacturing year and mileage. However, source 1 must be given at least one, and no more than four of the equality inputs.

Source 2 requires either the manufacturing year or the country of the manufacturer, and it can perform selections only on the mileage. Both sources 1 and 2 can output any of the roles of the car, except that source 1 cannot output the accident history of the car. Note that neither information source guarantees that it has all the cars that satisfy the constraints in its contents description. Therefore, not finding a specific European car in source 2 does not mean it cannot be found in source 1.

Sources 3 and 4 provide insurance quotes for Allstate and the American Automobile Association ("AAA"), respectively, both only for the New York City area. Both sources require identical information to return a quote, except that source 3 considers the accident history of the car as a factor in the premium, and therefore requires it as an input, while source 4 ignores this information in its quotes.

The description of a source tells the system how the contents of the source are related to the virtual relations in the world-view, and how they can be accessed, thereby enabling the system to locate data for the virtual relations. The contents of an information source are described by a set of view definitions. Each view definition is a conjunctive query. The meaning of a view v in the contents description is that the information source contains tuples that satisfy the definition of v and these can be obtained by the interface program to the source.

Although, a view definition may simply reflect that the view contains tuples of one of the world-view relations or a selection on such a relation, describing the contents by views enables modeling information sources that contain data that does not fit exactly into the schema of the world-view, but instead may be the result of joins, selections and projections on world-view relations. Note that this is a key difference from the way information sources are integrated in multi-database systems, as described in R. Ahmed, et al., "The Pegasus Heterogeneous Multi-Database System," IEEE Computer, pp. 19–26 (December 1991), hereby incorporated by reference as if fully set forth herein, where each source corresponds to a distinct set of classes in the schema.

For example, in the content description of source 1, view $v_1$ states that the source contains data about cars that are in the intersection of the classes carForSale and usedCar, and that furthermore satisfy the constraints on the year. Similarly, source 4 contains a projection and selection on a relation quote in the world-view, ignoring the accident history of the car.

While the content descriptions of the information sources indicate the data to be found, it does not indicate which queries the source can answer about its contents, since the source may only allow queries in which one or more of the arguments are bound. For example, the car databases introduced above require that at least one of the attributes of the car be given. This may be because the size of the answers may otherwise be too big, or because the server does not want to give away its entire database for security reasons. On the other hand, sources may have "positive" capabilities, i.e., the ability to perform some relational operations locally such as selections on the mileage and year of the car. It is useful to be aware of the positive capabilities since applying a selection locally at the source can significantly reduce the amount of information to be transmitted over a network, and the amount of processing required. Two capabilities encountered most often are the ability of sources to apply a number of selections, and the requirement that certain attributes be bound to values by the query. It should be noted that the capability of a source to perform specific join and projection operations can be modeled using the content descriptions of the sources to state that the source contains tuples of views resulting from these operation. This is however, only a limited form of specifying capabilities. Specific select-project-join queries that the source can answer have to be specified rather than specifying the relational operations separately from the relations to which they can be applied. Sources with capabilities to perform arbitrary relational operators are considered in A. Y. Levy, et al., "Answering Queries Using Limited External Processors," in Proceedings of ACM SIGACT-SIGMOD-SIGART Symposium on Principles of Database Systems (1996), hereby incorporated by reference as if fully set forth herein.

Formally, for every view definition v in the content description of a source a capability description is added, of the form $(S_{in}, min, max, S_{out}, S_{sel})$, where $S_{in}$, $S_{out}$, and $S_{sel}$ are sets containing variables in the head of v or role-chains on those variables, and min and max are integers, indicating the minimum and maximum number of inputs. Every variable in the head of v must appear in either $S_{in}$ or $S_{out}$ either as the variable itself or as a role-chain on the variable. The meaning of the capability description is that to obtain a tuple of v from the information source, the interface program must be given a binding for at least min elements of $S_{in}$. Providing the values $a_1, \ldots, a_n$ for the elements $\alpha_1, \ldots, \alpha_n$ in $S_{in}$, will result in all the tuples in the information source that satisfy $\alpha_1 = a_1 \& \ldots \& \alpha_n = a_n$. Note that if $\alpha_i$ is a role chain on a variable in the head of v, then the tuples for which at least one of the fillers of the role-chain is $a_i$ is obtained.

The elements in $S_{out}$ determine which head variables of v or role-chains on them can be returned from the information source. Therefore, providing the interface program with the values $a_1, \ldots, a_n$ for the elements $\alpha_1, \ldots, \alpha_n$ in $S_{in}$, and asking for the values $\beta_1, \ldots, \beta_n$ in $S_{out}$ will produce the tuples $(Y_1, \ldots, Y_1)$ that satisfy the following conjunction:

$$v(X_1, \ldots, X_m) \& \alpha_1 = a_1 \& \ldots \& \alpha_n = a_n \& \beta_1 = Y_1 \& \ldots \& \beta_1 = Y_1.$$

Finally, the set $S_{sel}$ denotes on which variables of v (or role-chains on these variables) the information source can perform selections. In one advantageous embodiment of the present invention, the kinds of selections that can be performed on each argument are also specified. The number of inputs given to the source from $S_{in} - S_{sel}$ cannot exceed max. We assume conjunctive selections that use the interpreted order relations ($\{\leq, <, \neq, =\}$). Note that the elements of $S_{in}$ can also be viewed as arguments on which the source can perform equality selections.

For example, source 1 requires that either the country of the manufacturer of the car or its model be given in the query (or both can be given). Sources 3 and 4 require that all the data about the car and the driver be given in order to produce the annual premium, with the exception that source 4 does not require the accident history of the car. In addition, source 1 is able to perform selections on the mileage of the car and the year it was manufactured.

In addition to content and capability descriptions, the descriptions of information sources contain additional information that is needed for the query processor, such as the name of the interface program to the source, the location, i.e., the uniform resource locater ("URL") of the source and locations of replicas of the source.

As a more specific example, consider the query $q_1$, asking for Japanese cars with less than 30,000 miles, and their annual insurance premium:

$q_1$(Car,Premium): JapaneseCar(Car) & mileage(Car) <30000 & year(CAR)≧1990 & quote(Agent,year (Car), model(Car), mileage(Car), history(Car), Age, City, Premium) & Age=25 & City=NYC.

To answer this query, the query planning algorithm further described below, will decide based on content, which information sources are relevant to the query. Source 1 is relevant because the classes of used cars and of Japanese cars are not disjoint, and the manufacturing years given in source 1 (≧1985) overlap with the years requested in the query (≧1990). Source 2 is irrelevant to the query because the class of European cars is disjoint from the class of Japanese cars. Sources 3 and 4 are relevant to the query because they provide quotes for the NYC area. Therefore, to obtain answers to the query, information from sources 1, 3, and 4 can be combined.

To create a plan for answering the query, the capabilities of sources 1, 3 and 4 must enable this combination. Since source 3 requires the accident history of the car but source 1, the only relevant information source for cars, does not supply it, sources 1 and 3 cannot be combined. Therefore, source 1 can only be combined with source 4.

Having identified sources 1 and 4 as the only available relevant sources, the system of the present invention may exploit the ability of the sources to perform selections. The selection on the year and the mileage can be pushed into source 1, thereby reducing the number of irrelevant cars obtained from the source. Note that if source 2 had been used, selection on year would have had to have been done after retrieving the data from the source.

As stated above, the user poses queries on one set of virtual relations and classes, or schema, of the world-view of the information sources. It should be emphasized that the world-view is not a set of relations that attempts to capture all possible domains, but rather is limited to the domains of the information sources accessed by the system. The world view is based on a data model that is able to state complex constraints on the content of information sources, and therefore make fine distinctions between them. The data model includes relations and class hierarchies. Class hierarchies are used both for modeling the declarative aspects of object oriented sources, and for expressing constraints on contents of sources.

Formally, the world-view includes relations of any arity and the standard interpreted relations for order (i.e., ≦, <, =, ≠). Unary relations in the domain model are called classes, and binary relations are called roles. For example, if r is a role and a is a constant, the phrase the r fillers of a refers to the set of constants X for which r(a,X) holds. More generally, the fillers of the role-chain $r_1, r_2 \ldots r_n$ on a constant a are all the values Y for which the following conjunction holds: $r_n(a_1,X_1)$ & $r_{n-1}(X_1,X_2)$ & . . . & $r_1(X_{n-1},Y)$, i.e., all the values obtained by following the path expression $r_1, \ldots r_n$ beginning from a. A subset of the binary relations (e.g., mileage and year) are identified as attributes, meaning that any individual can have at most one r filler. When all the roles in a role-chain are attributes, $\bar{r}(a)$ is used to denote the single value of the r filler of a, e.g., mileage (Car).

Class descriptions are expressions that use primitive classes and a set of description constructors, described below, to define sets of objects in the domain. For example, suppose the fillers of the role owner of a car are all the people who owned the car. A class description defining the class of Japanese cars, for which all owners are American and that had at most two owners is written as JapaneseCar⊓(all owner AmericanPerson)⊓(≦2 owner).

Formally, class descriptions are built as follows: (A denotes a primitive class, C and D denote class descriptions, r denotes a role, and $\bar{r}$ denotes a role chain).

A: Satisfied exactly by objects of class A

C⊓D: Satisfied by objects satisfying both C and D.

(all $\bar{r}$ C): Satisfied by objects for which all $\bar{r}$ fillers satisfy C.

(fills $\bar{r}$ a): Satisfied by objects that have a as one of their $\bar{r}$ fillers.

(≧n r): Satisfied by objects that have at least n r fillers.

(≦n r): Satisfied by objects that have at most n r fillers.

The purpose of class descriptions is to enable expressing complex constraints on the content of information sources, distinguish between sources, and decide which sources are, and which are not relevant to a given query. In addition, class descriptions describe relationships between classes in the world-view by associating class descriptions with some classes in the world-view. Associating a class in the world-view with a description defines the class intentionally to contain the objects that satisfy the description. Note that if a class E is associated with a description D, then D cannot mention E, and recursively, neither can the definitions of the classes mentioned in D.

To be useful, class descriptions must indicate whether one description subsumes another and whether two descriptions are disjoint. A description C subsumes a description D if an object that satisfies the constraints of D also necessarily satisfies the constraints of C, while C and D are disjoint if an object satisfying D cannot also satisfy C. In one advantageous embodiment of the present invention, class descriptions are written in a language that is a variant of the language used in the CLASSIC system as described in A. Borgida, et al, "CLASSIC: A Structural Data Model for Objects," Proceedings of the 1989 ACM SIGMOD International Conference on Management of Data, pp. 58–67 (1989), hereby incorporated by reference as if fully set forth herein. Using this language enables the determination of these two questions in time that is polynomial to the size of the descriptions.

As an example of these determinations, consider the description $D_1$=ItalianCar⊓(fills year 1995). $D_1$ is clearly subsumed by the description $D_2$=EuropeanCar⊓(fills year 1995) because ItalianCar is equivalent to EuropeanCar⊓(fills makeCountry Italy), and is therefore a subclass of EuropeanCar, and because the constraints on the attribute year are identical in $D_1$ and $D_2$. The description JapaneseCar is disjoint, however, from Italian Car⊓(fills year 1995) because Japanese and Italian cars are mutually exclusive sets.

Using class descriptions and interpreted relations, there are several ways to express constraints in the data model. Formally, a constraint can be expressed as a conjunction of atoms. An atom is either a literal of a relation in the world-view, i.e., owner(X,Y), a description atom D(X), where D is a description, or an atom of an interpreted predicate, e.g., $X \leq 5$. As used herein, a query is a conjunction of atoms of the form $\tau_1 \theta \tau_2$, where $\theta$ is one of the relational operators $\leq$, <, =, or $\neq$, or $C(\tau)$, where C is a class description, X denotes a variable and $\tau$, $\tau_1$, $\tau_2$ denote variables or constants.

One of the most critical problems when combining information from multiple sources is the different treatment of objects and values in various sources. First, some sources, such as object oriented databases are object based while others, such as relational databases are value based. Second, the same value may be represented differently in each source. For example, one source may have an ID associated with every person, to which their name, social security number and address are attached. Another source may represent these three values as attributes of one relation. One source may represent a person's name by first name followed by last name, while another may have the last name first, or only the first initial of the first name.

Combining information from multiple sources requires that these different representations be resolved, and that a means be available for determining when two information sources refer to the same real-world entity. Once it is determined that two information sources refer to the same real-world entity, information related to the entity, but from different sources, can be used to answer a user's query.

In an object-based system, collections of values, such as price and model, that describe one entity, are grouped into an object, such as a car object. Each object is an instance of a class, such as the car class, that defines the components of the object. While the components can include methods, as well as values, the present discussion is only concerned with values. In a relational database system, collections of values that describe a single entity are grouped as tuples. Each tuple is an entry in a relation, such as the car relation, that defines the components of the relation.

A single string or integer value is a primitive host value. Any collection of primitive host values, whether components of an object or of a tuple, are complex host values. Primitive or complex values must be compared to determine if information representations in multiple sources refer to the same real-world entity. In general, it may not always be possible to compare the values, because unique mappings between representations in different sources may not exist. In such a case, approximate matches must be relied upon.

The data model used in connection with the present invention contains host values to model various kinds of values and logical ID's to model entire objects. Host values are either primitive, e.g., integers and strings, or complex, i.e., records whose fields are other host values. The fields of complex host values are modeled by roles in the world-view. As an example, an instance of class person is a logical ID. The filler of the role name of an instance of person is an instance of class personName whose instances are complex host values. The roles of personName are firstName, middleInitial and lastName, each of which is a simple host value of type string.

In some cases host values can compare exactly, and in others approximate matching can be used. Exact comparison between primitive host values is straightforward, and approximate matching is done by substring matching or by using heuristics that depend on the particular value, e.g., determining that the "univ. of Toronto" is the same as "The University of Toronto". Two complex host values are exactly equal if each of their corresponding role values are exactly equal.

In addition to the problem of equality between the role fillers, an information source may not always be able to provide all the roles e.g., some source may not give the middle initial of a person. Here too heuristics that depend on the value being compared are used. In addition, complex host values always have a catch-all role, whose value is one string that captures all the other roles. For example, person-Name has the role fullName, that is a string including all the components of the name. The filler of this role is used for approximate comparisons if it is not possible to parse enough of the other role fillers from the information source.

One advantageous approach to comparing host values is the correspondence functions used in the Remote-Exchange system as described in D. Fang, et al. "The Identification and Resolution of Semantic Heterogeneity in Multidatabase Systems, Multidatabase Systems: An Advance Solution for Global Information Sharing," IEEE Computer Society Press, pp. 52–60 (1994), hereby incorporated by reference as if fully set forth herein. The remote exchange system is a system for discovering and sharing relevant information from autonomous information sources. Sharing is facilitated by comparing information at a variety of levels that range from the comparison of host values to the comparison of the structure and behavior of objects. In particular, the correspondence function determines the degree of equivalence of two objects by comparing the objects' host values at the required level of granularity.

Comparing logical ID's is more subtle. Some sources do not actually have objects corresponding to logical ID's in the world-view, and only have the fillers of the roles of the object. Even if ID's actually exist in some sources, they are not meaningful outside a specific source, and can therefore not be directly compared to each other. Deciding that two objects represented by logical ID's in two different sources are the same can only be done by comparing the values of their role fillers. Therefore, a set of keys, where each key is a set of role-chains, are associated with every class in the domain model. If two objects agree on the values for the fillers of the role-chains of a key, they are treated alike. For example, a key on an instance of person can be social security number, or the combination of name and home phone number. When a logical ID needs to be displayed as part of an answer to a query the known values of its roles are displayed.

Given a query and a description of the contents and capabilities of available information sources, a query plan must be generated for combining information from various information sources in a way that guarantees semantically correct answers. A query plan is a sequence of accesses to information sources interspersed with local processing operations. The plan must adhere to the capability requirements of the information sources, and should advantageously use the local processing capabilities of the information sources as much as possible.

A query plan in accordance with the present invention comprises two general steps. First, the content descriptions of the information sources are considered to determine the combination of sources that will yield semantically correct solutions, referred to herein as logical solutions. Second, each logical solution is considered to determine whether the accesses to the information sources can be ordered in a way that would satisfy their respective capability requirements, and advantageously exploit their local processing power. The ordered solutions are referred to herein as executable solutions. The logical and executable parts of the query planner are shown in FIG. 1 as logical planner 112 and execution planner 113, respectively. Once determined, the executable solutions are executed by execution engine 115.

In reasoning about the relevance of information sources, the descriptions of the contents of the sources are augmented to reflect the roles that can be obtained from the source as specified in the capability descriptions. Thus, if the contents of a source are described by the view definition $v(\overline{X}):-g_1(\overline{Y})$ & ... & $g_n(\overline{Y})$, and the associated capability description is $(S_{in}, \min, \max, S_{out}, S_{sel})$, where $S_{in} \cup S_{out} \cup S_{sel} = \{\alpha_1, \ldots, \alpha_\tau\}$, the augmented view definition of v is $v(\overline{X}, U_1, \ldots, U_\tau):-g_1(\overline{Y}_1)$ & ... & $g_n(\overline{Y})$ & $\alpha_1 = U_1$ & ... & $\alpha_\tau = U_\tau$. As an example, the augmented view definition of view $v_1$ of FIG. 3 is $v_1(X,U_1,U_2,U_3,U_4,U_5,U_6)$: carForSale(X) & usedCar(X) & year(X)$\geq$1985 & model(X)=$U_1$ & makeCountry (X)=$U_2$ & mileage(X)=$U_3$ & year(X)=$U_4$ & price(X)= $U_5$ & ownerContact(X)=$U_6$.

Hereafter reference to the view definition v, refers to the corresponding augmented view definition.

Finding a logical solution, i.e., a combination of information sources that produce answers to the query, means finding a query Q' that uses only the views in the content descriptions, and interpreted relations, such that every answer to Q' is an answer to Q. Described in this way, finding a logical solution is closely related to answering queries using views, well known to those skilled in the art. See for example, Surajit Chaudhuri, et al., "Optimizing Queries with Materialized Views," in Proceedings of Int'l. Conf. on Data Eng. (1995); Alon Y. Levy, et al., "Answering Queries Using Views," in Proceedings of the 14th ACM SIGACT-SIGMOD-SIGART Symposium on Principles of Database Systems (1995); Xiaolei Qian, "Query Folding," in Proceedings of the 12th International Conference on Data Engineering pp. 48–55 (1996); Anand Rajaraman, "Answering Queries Using Templates with Binding Patterns," in Proceedings of the 14th ACM SIGACT-SIGMOD-SIGART Symposium on Principles of Database Systems (1995); and H. Z. Yang and P. A. Larson, "Query Transformation for PSJ-Queries," in Proceedings of the 13th Int'l. VLDB Conference pp. 245–54 (1987), all of which are hereby incorporated by reference as if fully set forth herein.

Answering a query Q with available relations $e_1, \ldots, e_m$, using a set of view definitions $v_1, \ldots, v_n$, over the same relations, involves finding a query Q' that uses $v_1, \ldots, v_n$, such that for any instantiation of the relations $e_1, \ldots, e_m$, the answers produced by Q and Q' are identical. Solving for logical solutions, however, differs from answering queries using views in two respects. First, Q' does not have to be equivalent to Q, but merely contained in Q. This means that for any instantiation of the relations $e_1, \ldots, e_m$, the answers produced by the logical solution Q' are a subset of those produced for Q. For example, a query for Japanese cars could have a logical solution from a database of Toyotas, although Toyotas are only a subset of all Japanese cars. Second, since information sources usually provide only a subset of the views by which they are described, all possible Q's that can generate answers for Q are necessary. For example, to solve a query for used cars, two information sources of Japanese cars must be considered if neither of them contain all Japanese cars. Formally, the task of finding all the logical solutions to a query Q can be defined as: Given a conjunctive query Q, a logical solution to Q is a non-empty conjunctive query Q' that uses only views in the contents descriptions and interpreted relations, and such that Q' is contained in Q. Note that if the query $Q:-q(\overline{X}):-g_1(\overline{X}_1)$ & . . . & $g_m(\overline{X}_m)$ & $C_q$, where $C_q$ is the conjunction of the subgoals of interpreted predicates in the query, can be answered using a disjunction of conjunctive queries, then each one of the conjunctive queries is a logical solution. The set of constraint subgoals of the query, that includes both the interpreted subgoals and the class description subgoals, is denoted by C(Q).

One advantageous method for determining logical solutions separately computes for each subgoal in the query the relevant information sources from which tuples of that subgoal can be obtained and then considers all possible combinations of information sources for each subgoal in the query to determine whether any of the combinations is a correct logical solution. This method exploits the characteristics of the domain to be efficient in practice, and considers the subtleties arising from the existence of class constraints, which are not considered in previous work. The method first computes a set of pairs of the form (I, v), where I is an information source, and v is one of the views in the content description of I for every non-interpreted subgoal $g_i$. The head of v is unified with the variables of $g_i$ to the extent that the constraints in Q do not contradict the constraints in v after the unification with $g_i$. One advantageous computer implemented program for performing this step in determining logical solutions is given in pseudo code in FIG. 4.

To further illustrate the query plan step of solving for logical solutions, consider the query q1(Car, Premium):

JapaneseCar(Car) & mileage(Car)<30000 & year(Car) $\geq$1990 & quote(Agent, year(Car), model(Car), mileage (Car), history(Car), Age, City, Premium) & Age=25 & City=NYC, the subgoal JapaneseCar(Car) and the view $v_1$ in source 1 in FIG. 3. JapaneseCar(Car) is unified with carForSale(X), resulting in the unification {X→Car}. The constraints imposed in the definition of v1 are checked for consistency with the constraints imposed in $q_1$. Specifically, the question is whether the constraint JapaneseCar(Car) & mileage(Car) <30000 & year(Car)$\geq$1990 & carForSale(Car) & usedCar (Car) & year(Car)$\geq$1985, in other words, a used Japanese car for sale with less than 30,000 miles and manufactured not earlier than 1991, is satisfiable. Since the classes carForSale and usedCar are not disjoint with JapaneseCar, and the years of manufacturing overlap with those in the query, $v_1$(Car) is deemed to be a relevant source view.

For Source 2, JapaneseCar(Car) is also unified with usedCar(X) and the result is found to be the same as the first unification. Source 2 is deemed irrelevant because European cars and Japanese cars are disjoint classes. Next, the quote subgoal is considered and sources 3 and 4 are found to be relevant because their location matches the query. Therefore, the output of the procedure generate-relevant-sources is {(Source1, $v_1$(Car, model(Car), makeCountry(Car), mileage(Car), year(Car), price(Car), OwnerContact (Car)))} for the first subgoal, and {(Source3, $v_3$(Agent, year(Car), model(Car), mileage (Car), history(Car), 25, NYC, Premium)), (Source4, $v_4$(Agent, year(Car), model(Car), mileage(Car), 25, NYC, Premium))} for the second subgoal. Note that the unification of the query subgoal with $v_4$ does not consider the history of the car in the query, while history is considered in the unification with $v_3$.

The second step of the method for finding logical solutions considers every conjunctive query Q' of the form Q': $q':-v_1(\overline{Y}_1)$ & ... & $v_n(\overline{Y}_n)$ & $C_q$ where $v_i$ is the view in one of the pairs computed for the subgoal $g_i$. Any minimal subset of Q' contained in Q, or that can be made to be contained in Q by adding interpreted subgoals is added to the list of logical solutions. One advantageous containment test is an extension of a containment algorithm for conjunctive queries with built-in predicates that considers the semantics of the class descriptions. This algorithm is described in Alon Y.

Levy and Yehoshua Sagiv, "Queries Independent of Updates," in Proceedings of the 19th VLDB Conf. pp 171–81 (1993), hereby incorporated by reference as if fully set forth herein. Although containment is known to be intractable in general, its intractability is in the size of the query, which tend to be small, and only occurs when queries have multiple occurrences of the same relations, which does not happen frequently in practice.

For example, combining sources 1 and 3 results in q'(Car, Premium): $v_1$(Car, model(Car), makeCountry (Car), mileage(Car), year(Car), price(Car), OwnerContact(Car)) & $v_3$ (Agent, year(Car), model (Car), mileage(Car), 25, NYC, Premium) & mileage(Car)<30,000 & year(Car)≧1990.

To test whether q' is contained in Q, q' is expanded with the definitions of the views, to obtain the equivalent form q"(Car, Premium):

carForSale(Car) & usedCar(Car) & year(Car)≧1985 & quote(Agent, year(Car), model(Car), mileage(Car), history(Car), 25, NYC, Premium) Agent=Allstate & mileage(Car)<30,000 & year(Car)≧1990 on which containment is verified. Note that for clarity, some of the subgoals that were added to $v_1$ during the view augmentation were omitted from q" since they are not needed for the containment test. To verify that q" is contained in Q, every subgoal in Q is checked to determine whether it will be entailed by some subgoal in q". It is easy to see that this condition is satisfied for all subgoals except for JapaneseCar(Car). To determine whether JapaneseCar (Car) can also be enforced, the containment test will note that this subgoal can be rewritten as car(Car) & makeCountry(Car, Japan). The first conjunction is entailed by carForSale(Car), and the second conjunction can be enforced by adding the subgoal makeCountry(Car)=Japan to q'. Thus the solution q'$_1$(Car, Premium): $v_1$(Car, model(Car), makeCountry (Car), mileage(Car), year(Car), price(Car), OwnerContact(Car)) & $v_3$(Agent, year(Car), model (Car), mileage(Car), 25, NYC, Premium) & mileage(Car)<30,000 & year(Car)≧1990 & makeCountry(Car)=Japan is added to the set of logical solutions.

It is well known from general principles of answering queries with view definitions that if the view definitions in the content descriptions of the sources and the query do not contain non-primitive class descriptions, the foregoing method will produce all the needed logical solutions. The subtle point to note is that even though there may be logical solutions that are not produced by the foregoing method, these additional solutions will not yield any answers to the query that are not yielded by the logical solutions that are found. In the presence of arbitrary class descriptions, the query may be preprocessed to obtain an equivalent query of polynomial size, such that the foregoing method will find all the needed logical solutions.

It is not well settled in the art whether a preprocessing method yet exists that guarantees all logical solutions. However, applicants consider a method for translating all complex class descriptions into canonical form such that conjunctions of primitives appear only in a query and not in the description. Borgida, et al., "CLASSIC: A Structural Data Model for Objects," supra.

A logical solution guarantees that the answers obtained by the solution will be semantically correct. However, it does not consider the capabilities of the information sources to answer the queries. Thus, the second part of formulating a query plan involves determining executable solutions which are subgoals of a logical solution, ordered in a way that satisfies the capability requirements of the relevant information sources. To be executable, an ordering of the subgoals of a logical solution must satisfy two conditions. The first condition is that the input binding requirements of the information sources must be satisfied, either from the input to the query or from the output of previous subgoals. The second condition is that if a variable occurs in two subgoals, its values from the different sources can be compared, either directly or through keys, as described above.

Formally, an executable solution is an ordering $v_1(\bar{X}_1), \ldots, v_n(\bar{X}_n)$ on the view literals of the logical solution. An argument is either a variable in the logical solution or a role-chain on one of the variables. The capability description of $v_i$ are denoted by $(S^i_{in}, S^i_{out}, min^i, max^i, S^i_{sel})$. For every subgoal the plan will assign triples $(v^i_{in}, v^i_{out}, v^i_{sel})$. The set $v^i_{in}$ is the set of arguments that will be passed to the it information source, $v^i_{out}$ is the set of arguments that will be obtained from it, and $v^i_{sel}$ is the set of arguments on which it will perform selections. $Q_{in}$ denotes the set of $v_i$ attributes available explicitly in the query and $Q_{out}$ denotes the set of arguments required in the answer. Thus an executable solution can be defined as an ordering $v_1(\bar{X}_1), \ldots, v_n(\bar{X}_n)$, and assignments $(v^i_{in}, v^i_{out}, v^i_{sel})$ for $1 \leq i \leq n$ is said to be an executable plan if the following conditions hold for every I, $1 \leq I \leq n$:

1. $V^i_{in} \subseteq S^i_{in}$, and $V^i_{out} \subseteq S^i_{out}$ and $V^i_{sel} \subseteq S^i_{sel} \cup S^i_{in}$,
2. $V^i_{in} \subseteq Q_{in} \cup V^1_{out} \cup \ldots \cup V^{i-1}_{out}$, and
3. The cardinality of $V^i_{in} \cup V^i_{sel}$ is at most $max^i$, and the cardinality of $V^i_{in}$ is at least $min^i$,
4. $Q_{out} \subseteq Q_{in} \cup V^1_{out} \cup \ldots \cup V^n_{out}$, and
5. If a variable X appears in two subgoals $v_i$ and $v_j$ than the two occurrences are connected.

The connection relation is the transitive closure of the directly-connected relation, defined as follows. An occurrence of X in $v_i$ and in $v_j$ are said to be directly connected if $V^i_{in} \cup V^i_{out}$ contains a key on X that is also in $V^j_{in} \cup V^j_{out}$.

The first four conditions guarantee that the capability restrictions of the sources are satisfied, i.e., that the minimum number of inputs are supplied to the sources, and that the inputs are available from previous subgoals. The last condition guarantees that values for different occurrences of variables can be compared properly.

Referring to FIG. 5 one advantageous computer implemented program written in pseudo code, is given for determining and generating an executable ordering on the subgoals of a logical solution in polynomial time.. The program proceeds by maintaining a list of available arguments using procedure propagate-available-arguments, and at every point adds to the ordering any subgoal whose input requirements are satisfied. Finally, the program checks that variable occurrences are connected and pushes as many selections as possible to the sources. The procedure propagate-available-arguments determines which arguments are implicitly available. For example, if makeCountry(X,Y) is a subgoal in the query, and makecountry is an attribute i.e., it can only have one value, then if the argument continent—makeCountry(X) is available, continent(Y) is available. In other words, if Y is the country of make of Toyota, and the continent of make of Toyota is Asia, the continent of Y is Asia.

For a more specific example, consider the logical solution q'$_1$ discussed above. The arguments available in the query are the makecountry of the car, (derived from the class constraint JapaneseCar), and the age and city of the driver. Therefore, the subgoal of $v_1$, is put first, since one of its inputs, makeCountry(Car)=Japan is available. As a result of querying source 1, the values for year, model and mileage are obtained. However, since source 3 also requires the accident history of the car, the $v_3$ subgoal input requirements are not satisfied, and therefore this logical solution is not executable. In contrast, the input requirements of source 4, are satisfied because source 4 does not require the accident history. Since source 1 can perform selections on year and mileage, the generated query plan will push these selections to source 1. Finally, since all the values passed between sources 1 and 4 are primitive host objects, i.e., strings and integers, all variables are connected.

Note, that if an ordering of the subgoals of a logical solution Q', and a subgoal $v_i$ appears in the it position, then the input requirements Q' will be satisfied even if other subgoals are pushed in front of $v_i$ because the set of available arguments increases monotonically. Also note, that the connectivity of multiple occurrences of variables is independent of the ordering of the subgoals.

Given these observations, and an executable ordering $v_i, \ldots, v_n$ of the subgoals of Q', the subgoal $v_i$ will be added at some point to the ordering because its input requirements are already satisfied by the explicit bindings in the query. Inductively, if the subgoals $v_1, \ldots, v_{i-1}$ are added at some point to the ordering, ultimately $v_i$ will be added to the ordering, since its input requirements are satisfied after $v_1, \ldots, v_{i-1}$ have been added. Therefore, since all subgoals will be added at some point, an executable ordering will be found.

Referring to FIG. 6, computer implemented program create-executable-plan, generalizes an algorithm described in K. A. Morris, "An Algorithm for Ordering Subgoals in NAIL!," in Proceedings for the 11th ACM SIGACT-SIGMOD-SIGART Symposium on Principles of Database Systems, pp. 82–88 (1988), hereby incorporated by reference as of fully set forth herein, for ordering subgoals in the presence of binding constraints in two ways. First, the values passed to the subgoals are not simply values of variables, but possibly fillers of role-chains on these variables, and there are requirements on which sets of role-chains are sufficient. Second, the method of finding executable solutions must ensure that multiple occurrences of values of the same variable from different sources can be compared via keys.

The language described herein for describing information sources for use in accordance with the present invention allows only one capability description for every view definition in the contents description of a source. This restriction essentially means that the arguments that can be obtained from an information source do not depend on which arguments were chosen in order to satisfy its capability requirements. Conceivably, there may be situations in which the output set depends on which set of input attributes are used. In such a case, determining whether there exists an executable ordering for a logical solution is intractable. If every view definition in the content descriptions of information sources could have more than one capability description of the form $(S_{in}, \min, \max, S_{out}, S_{sel})$ then determining whether a logical solution has an executable ordering is NP-complete, as the term is defined in Michael R. Gray and David S. Johnson, "Computers and Intractability: A Guide to the Theory of NP-Completeness," (W. H. Freeman and Co. 1979), hereby incorporated by reference as if fully set forth herein, because we can simply guess an ordering, and check whether it satisfies the requirements of the information sources in polynomial time.

We show the NP-hardness by reducing the satisfiability problem of 3CNF formulas to our problem. Let $\Delta$ be a set of 3CNF formulas, with the propositional variables $p_1, \ldots, p_n$ and clauses $c_1, \ldots c_m$. We construct a logical solution with n+m subgoals, Each subgoal uses a different information source, and all subgoals have exactly one variable, X. For each of the first n subgoals, we have the following capability description: $(\theta,0,0,\{p^1_i(X)\},\theta),(\theta,0,0,\{p^2_i(X)\},\theta)$ that is, there are no requirements on the input or selection arguments, but there are two possible outputs, either the $p^1_i$ or $p^2_i$ argument.

Intuitively, the choice of output determines the truth value of the proposition $p_i$. The next m subgoals are one for each clause. Suppose the i'th clause is $\{L_1,L_2,L_3\}$, where each $L_i$ is a literal. The (n+i)'th subgoal has one capability description. The input set $S_{in}$ contains three elements: for $1 \leq j \leq 3$ it contains $p^1_i(X)$ if $L_i = p_i$ and $p^2_i(X)$ if $L_i = \neg p_i$. The minimum number of inputs is 1 and the maximal number is 3. There are no output or selection arguments.

Clearly, if $\Delta$ is satisfiable, there is a way to satisfy the capability requirements in the query. We choose the capabilities of the first n subgoals to produce exactly the satisfying assignment to variables of $\Delta$, i.e., $p^1_i(X)$ if $p_i$ is assigned True, and $p^2_i(X)$ otherwise. The next m subgoals are satisfied, since each of the clauses in $\Delta$ are satisfied by the truth assignment. Similarly, if there is a way to satisfy the requirements of the information sources then we can build a satisfying assignment in a straightforward fashion. Finally, our reduction is polynomial because the query we produced is polynomial in the size of $\Delta$.

In one preferred embodiment of the present invention the user is provided with a stream of answers to the query. In this embodiment it is more important to minimize the time to begin and sustain the stream, then to minimize the time to provide all the answers to the query. Minimizing the time to the early tuples is important because the user is likely to find a satisfactory answer before all answers are exhausted. The time to the early tuples is minimized by generating the executable solutions in the order of their likelihood to find answers to the query, and executing them as soon as they are available. The likelihood of the executable solutions is based on estimates given with the description, on how likely a source is to contain tuples of a certain view. For example, when looking for books, the Library of Congress is very likely to have a given book in comparison with other bibliography servers. The query plan executor also tries to access information sources in parallel whenever the plan allows for parallelism.

One experimental embodiment of the present invention was developed in Bell Laboratories and is referred to as the Information Manifold. The Information Manifold uses the techniques described herein to provide a uniform query interface to structured information sources on the World Wide Web. Users interact with the Information Manifold through a web based interface that enables users to see which information sources are available and to browse through the categories of available information, i.e., the world-view. Users can formulate queries using individual templates available for classes in the world-view, or by combining the templates into an arbitrary conjunctive query.

The Information Manifold includes a set of tools to accelerate the process of generating interface programs to information sources on the WWW. In particular, many sources on the WWW have a form-based interface. One of the tools determines the correspondence between the variables used in the form and the world-view, and then specifies a grammar describing the format of the answers obtained from the source, and the bulk of the interface program is generated automatically.

The world-view with which the user interacts is designed with respect to the set of information sources to which we expect to provide access. An important issue is designing tools to obtain descriptions of information sources easily. One such tool designed to obtain descriptions of name server sources is described in Alon Y. Levy and Joann J. Ordille, "An Experiment In Integrating Internet Information Sources," in Working Notes of the AAAI Fall Symposium on AI Applications in Knowledge Navigation (1994). The tool is based on asking the administrators of the name servers to annotate example entries from their databases so that we can infer the content descriptions of the source from the annotations.

The foregoing merely illustrates the principles of the present invention. Those skilled in the art will be able to devise various modifications, which although not explicitly described or shown herein, embody the principles of the invention and are thus within its spirit and scope.

What is claimed is:

1. An information manifold system for processing a query with information from at least two of a plurality of available information sources, each information source having certain capabilities, at least two of said information sources having non-identical capabilities, the information manifold system comprising:

a query interface for formulating said query in terms of a schema of a world-view of said plurality of available information sources;

a query plan generator for formulating a query plan that exploits the capabilities of said information sources with non-identical capabilities, the query plan generator including storage for descriptions of the capabilities of said information sources, said query plan generator including means for generating at least one logical solution to said query, said query plan generator further including means for generating an executable order of said at least one logical solution;

a query plan execution engine for executing said query plan after said query plan is formulated; and means for returning information which is responsive to said query, from at least two of said available information sources.

2. A system according to claim 1 wherein said query interface is a uniform query interface such that a single query can access multiple heterogenous information sources.

3. A system according to claim 1 wherein said world-view is a data model including at least one relation identifiable with at least one class and arranged in accordance with a class hierarchy, where a class is a unary relation in said data model, wherein each of said information sources are identifiable by content description and capability descriptions, and wherein said query plan generator includes means for identifying those of said plurality of available information sources that can be combined in a manner satisfying said capabilities.

4. A system according to claim 1 wherein said query plan generator further comprises means for determining those of said plurality of available information sources that contain information responsive to said query at least in part.

5. A system according to claim 1 wherein said query plan execution engine includes means for combining information from a plurality of said available information sources.

6. A system according to claim 5 wherein at least part of said information from said plurality of available information sources is grouped into at least one object, wherein each object is an instance of a class, said system further comprising means for determining whether any of said objects is referred to in more than one of said plurality of available information sources.

7. A system according to claim 6 wherein said means for determining includes at least one key associated with a unique one of said classes in said data model such that each of said objects has a unique key.

8. A system according to claim 5 wherein said information from said plurality of available information sources includes at least one value, said system further comprising means for determining whether a given one of said values appears in more than one of said available information sources.

9. A system according to claim 8 wherein said means for determining includes at least one host value for modeling said values in each of said relevant information sources.

10. A system according to claim 9 wherein said means for determining includes means for approximating comparisons between a plurality of host values.

11. A method for processing a query with information from at least two of a plurality of available information sources, each information source having certain capabilities, at least two of the information sources having non-identical capabilities, said method comprising the steps of:

formulating said query in terms of a schema of a world-view of said plurality of available information sources;

storing descriptions of the capabilities of the information sources;

determining those of said plurality of available information sources that are responsive to said query at least in part;

formulating a query plan that exploits the capabilities of said information sources that are responsive to said query at least in part and have non-identical capabilities, said formulating a query plan step including step for generating at least one logical solution to said query, said formulating a query plan step further including step for generating an executable order of said at least one logical solution;

after said formulating step, executing said query plan; and returning information to said user, from at least one of said information sources that are responsive to said query at least in part.

12. A method according to claim 11 wherein said world-view is a data model including at least one relation identifiable with a class and arranged in accordance with a class hierarchy, where a class is a unary relation in said data model, wherein each of said information sources are identifiable by content description and capability descriptions, and wherein said formulating a query plan step includes identifying those of said information sources that are responsive to said query at least in part that can be combined in a manner satisfying said capabilities.

13. A method according to claim 11 wherein said executing step includes combining information from a plurality of said information sources that are responsive at least in part.

14. A method according to claim 13 wherein said information from said plurality of information sources that are responsive includes at least one object, said method further comprising the step of determining whether more than one of said plurality of information sources that are responsive to said query at least in part refers to the same object.

15. A method according to claim 14 wherein said determining whether more than one of said plurality of information sources that are responsive to said query at least in part refers to the same object step includes associating a key with a unique one of said classes in said data model such that each of said objects have a unique key.

16. A method according to claim 13 wherein said information from said plurality of information sources that are responsive includes at least one value, said method further comprising the step of determining whether more than one of said information sources that are responsive refers to the same value.

17. A method according to claim 16 wherein said determining whether more than one of said information sources that are responsive refers to the same value step, includes modeling each of said values to a host value.

18. A method according to claim 17 wherein said determining whether more than one of said information sources that are responsive refers to the same value includes approximating comparisons between a plurality of host values.

\* \* \* \* \*